Figures 3, 4:
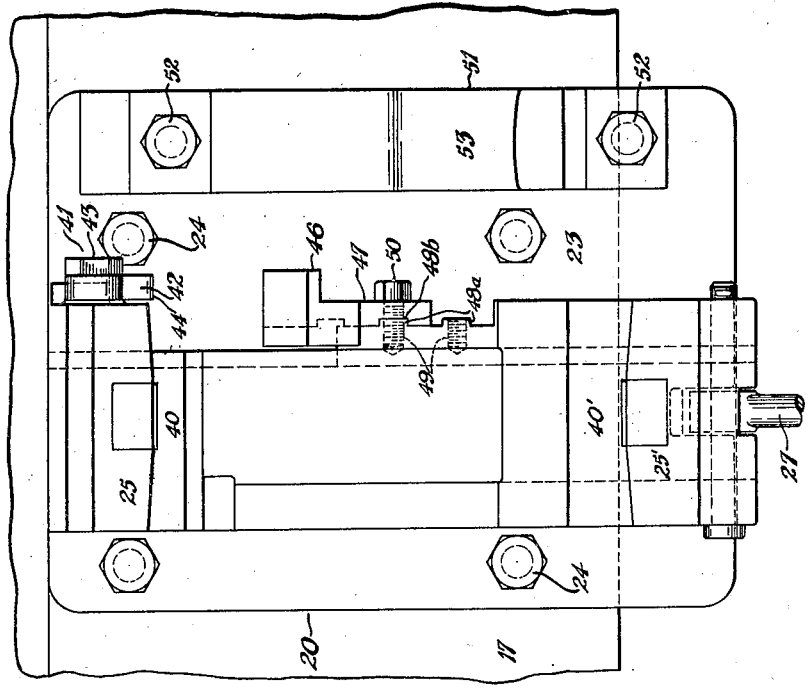

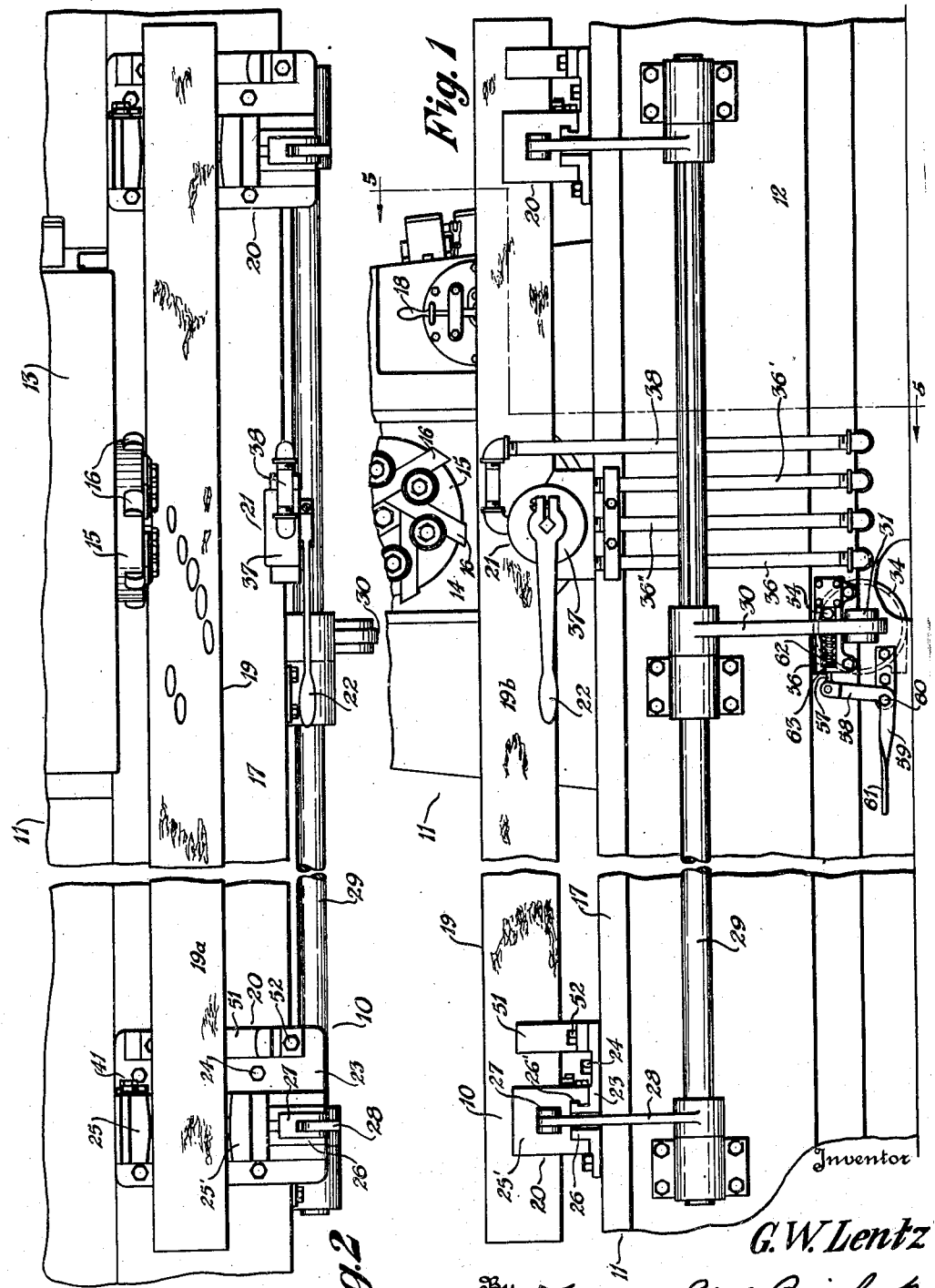

Oct. 24, 1933.  G. W. LENTZ  1,932,185
AUTOMATIC CHUCK FOR BILLETS AND THE LIKE
Filed July 23, 1930  5 Sheets-Sheet 2

Inventor
G. W. Lentz
By Frease and Bishop
Attorneys

Oct. 24, 1933.   G. W. LENTZ   1,932,185
AUTOMATIC CHUCK FOR BILLETS AND THE LIKE
Filed July 23, 1930   5 Sheets-Sheet 3

Inventor
G. W. Lentz
By Frease and Bishop
Attorneys

Oct. 24, 1933.　　　G. W. LENTZ　　　1,932,185
AUTOMATIC CHUCK FOR BILLETS AND THE LIKE
Filed July 23, 1930　　　5 Sheets-Sheet 5

Inventor
G. W. Lentz
By Frease and Bishop
Attorneys

Patented Oct. 24, 1933

1,932,185

UNITED STATES PATENT OFFICE 1,932,185

AUTOMATIC CHUCK FOR BILLETS AND THE LIKE

George W. Lentz, Canton, Ohio, assignor to The Bonnot Company, Canton, Ohio, a corporation of Ohio Application July 23, 1930. Serial No. 470,065

4 Claims. (Cl. 90—59)

My invention relates to chucks for mounting billets and the like more particularly on the bed of a machine tool, and which may be for example the chipping machine set forth in my prior application for United States Letters Patent for Chipping methods and machines, filed July 3, 1930, Serial No. 465,582.

Such a chipping machine is used for removing surface defects from the several faces of semi-finished rolling mill products, such as billets.

Such surface defects include scale, seams, slivers, snakes, scabs, and the like, and may occur on each of the four longitudinally extending faces of a square or rectangular billet.

A billet of unusual size is relatively heavy and it has been a relatively difficult and time consuming task to turn such a billet from its mounting means to present another face to the tool head of the chipping machine after the surface defects of one face have been removed.

The objects of the present invention include the provision of an apparatus comprising an automatic chuck, which is adapted for clamping a billet for presenting any of its faces in position to be worked on by a tool head, for releasing the clamped billet, and for applying forces for turning the billet in the chuck in released position for presenting another billet face to be worked on by the tool head.

The foregoing and other objects are attained by the machine, apparatus, parts, improvements, and combinations which comprise the present invention, and which are particularly and distinctly pointed out and set forth in the appended claims forming part hereof.

In general terms, the improved automatic chuck is adapted for selectively positioning a piece of material for having work performed at one or more locations on a surface thereof, and includes releasable means for clamping the piece and presenting one surface location in position to be worked on, control means for selectively actuating the clamping means to engage or release the piece, and means operable when the clamping means are in released position for turning the piece for presenting another surface location in position to be worked on, the turning means preferably including spaced supports which are laterally spanned by the piece before, during, and immediately after engagement by the clamping means, trip lever means for moving the piece from spanning position after release by the clamping means, whereby the piece will turn about its longitudinal axis between the supports, means for returning the piece to another lateral spanning position on the supports, and means for guiding the piece during turning thereof.

Figure 7:
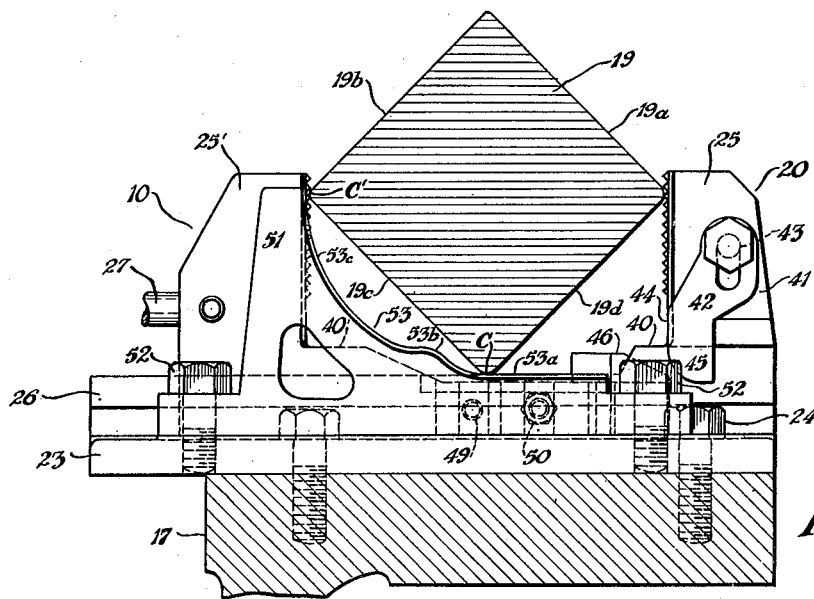
Figures 5, 6:
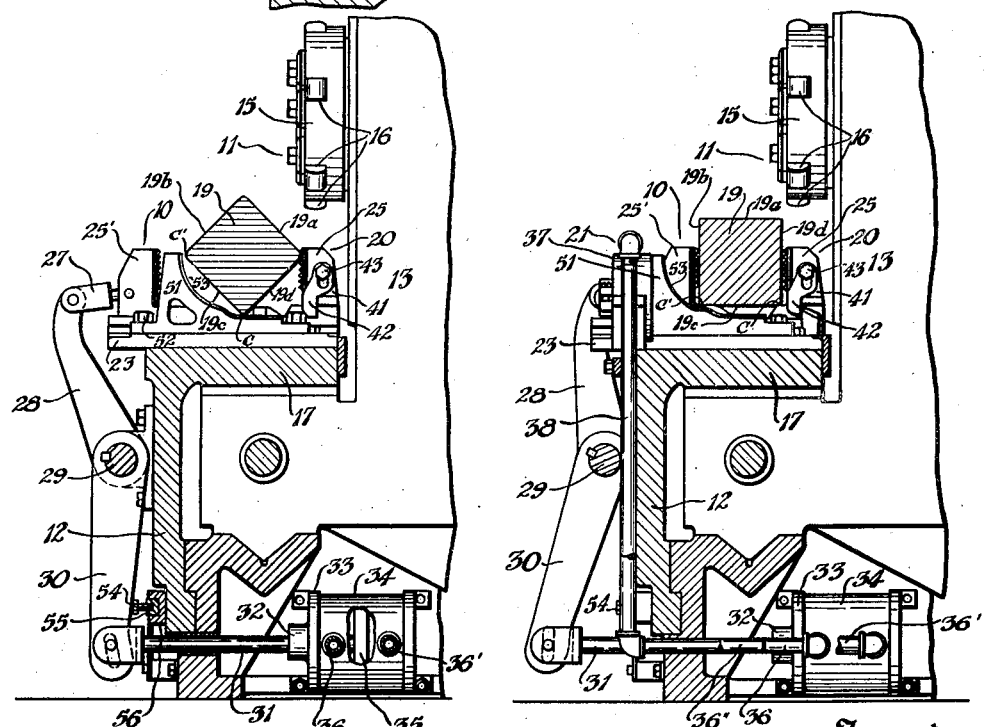
Figure 8:
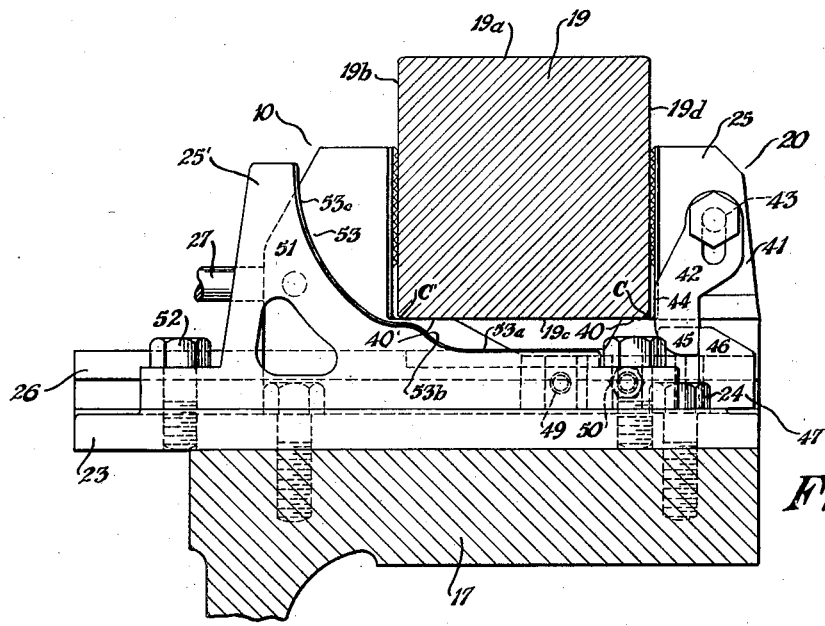
Figure 9:
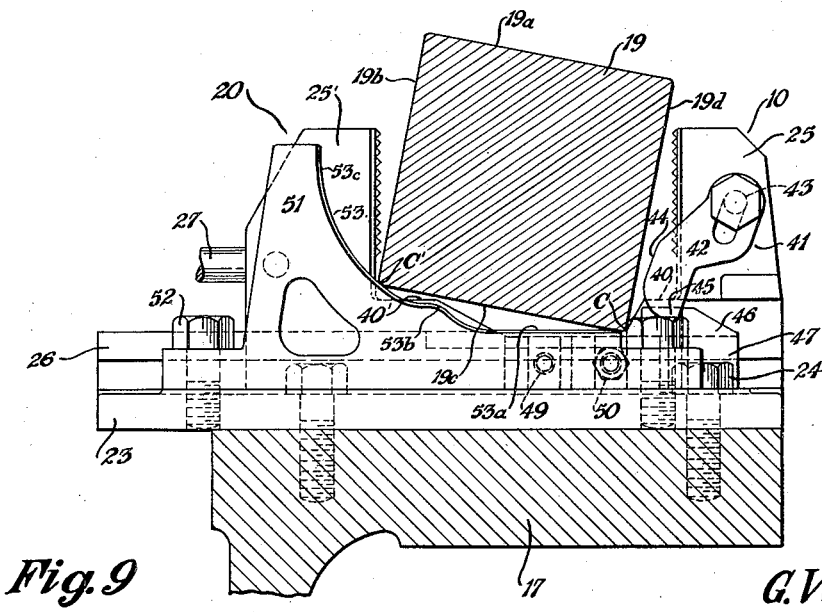
Figure 10:
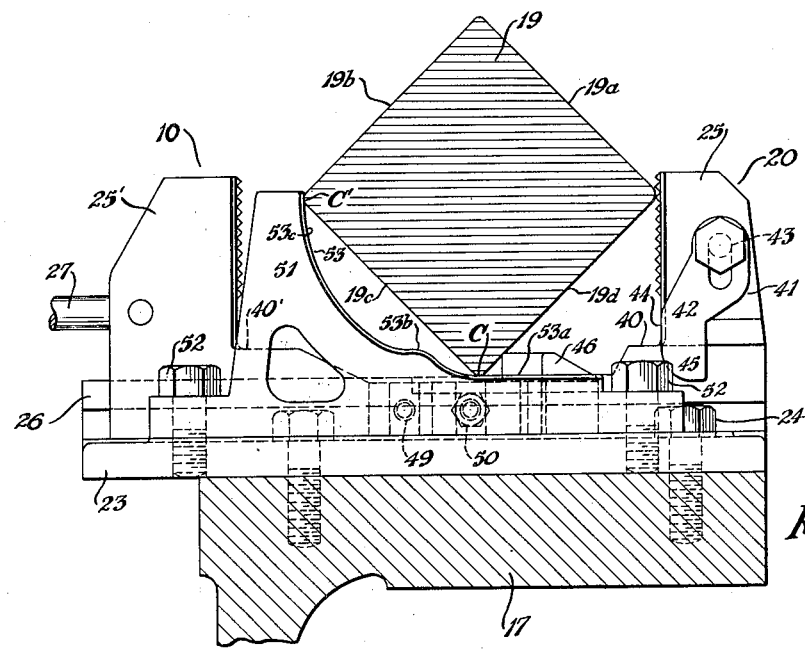
Figure 11:
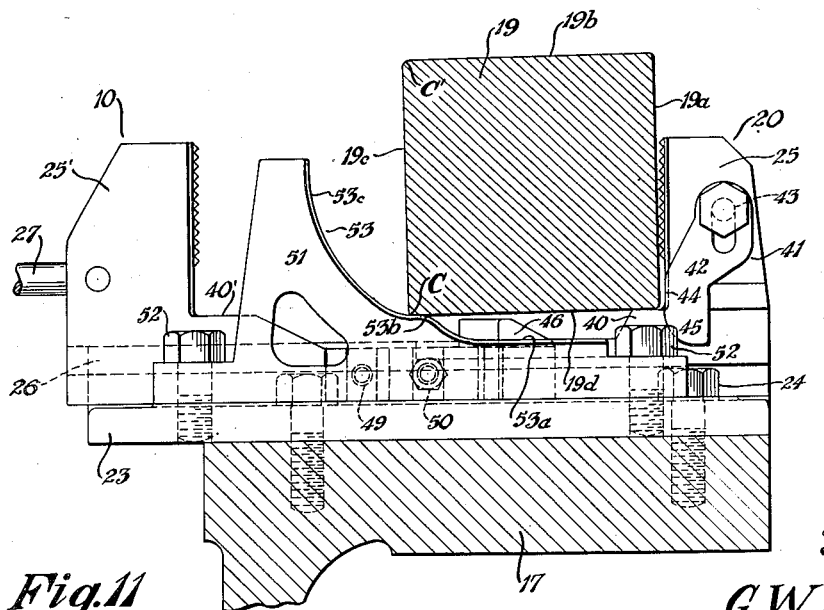

A preferred embodiment of the improved automatic chuck is illustrated in the accompanying drawings forming part hereof, in which Figure 1 is a fragmentary front elevation of the preferred embodiment of the improved automatic chuck in use for manipulating a billet on one of the improved chipping machines set forth in my prior application for patent, Serial No. 465,582;

Fig. 2, a fragmentary plan view thereof;

Fig. 3, an enlarged detached fragmentary plan view illustrating parts of the automatic chuck in billet or piece engaging position, but with the billet or piece removed;

Fig. 4, a view thereof similar to Fig. 3, with the billet or piece removed, and illustrating the relative positions of parts of the chuck when the jaws of the clamping means are at a position of extreme displacement from each other;

Fig. 5, a fragmentary transverse sectional view as on line 5—5, Fig. 1;

Fig. 6, a view similar to Fig. 5 illustrating one position of the parts of the chuck when being used to turn a billet from the engaged position illustrated in Fig. 5, in which an upper plane face of the billet is horizontal, to the position illustrated in Fig. 6, in which a longitudinal corner of the billet is presented upwards;

Fig. 7, an enlarged fragmentary view similar to Fig. 6, after clamping the billet in the position to which it has been moved in Fig. 6;

Fig. 8, an enlarged fragmentary view similar to Fig. 5 illustrating a billet in the normal position of engagement by the clamping means with a plane face of the billet horizontal and presented upwards for being worked on by the tool head of the chipping machine;

Fig. 9, a similar view illustrating a succeeding position of the billet and parts of the chuck after release of the clamping means and during turning of the billet;

Fig. 10, a similar view illustrating the relative position of the billet and parts of the chuck after further turning the billet; and Fig. 11, a similar view illustrating the return of the billet to another position of lateral spanning on the supports of the chuck, and presenting another plane face upwards, ready to be again engaged by the clamping means.

Similar numerals refer to similar parts throughout the drawings.

The improved automatic chuck is indicated generally at 10, and is in use on a chipping machine indicated generally at 11, and the chipping machine may be of the type set forth in my prior application for United States Letters Patent Serial No. 465,582, and includes a longitudinally extending bed 12, in upper surfaces of which are provided longitudinally extending carriageways on which a tool head carriage 13 is mounted for longitudinal movement.

A tool head elevator indicated generally by 14 is mounted for vertical movement upwards and downwards in the carriage 13, and a tool head 15 is operatively mounted in the elevator 14 for rotation about a laterally extending horizontal axis.

The tool head 15 has mounted therein a plurality of cutting tooth tools 16, the outer end of each of which is preferably ground for making a gouge cut, and each tooth tool 16 is rotated with the tool head or moved by longitudinal movement of the carriage 13 in planes parallel with the longitudinal direction of movement of the carriage 13.

The tool head 15 is carried at the end of a laterally extending shaft which is laterally movable for adjusting the lateral position of the tool head, and the tool head extends laterally forwardly from the elevator and carriage over a work supporting table 17 which is formed on the upper side of the bed 12 at the work side of the carriage 13.

As is set forth in greater detail in my aforesaid prior application for patent, all the movements of the carriage 13, and of the elevator 14, and the rotary movement of the tool head are controlled by control means actuated by a control handle 18 which is conveniently located at the operator's right on the carriage 13, the normal position of the operator being to face the tool head, and to manipulate the control handle 18 with his right hand.

Lateral movement of the tool head cross-wise of the work is attained by a lateral control wheel not shown which is normally manipulated by the operator's left hand.

A billet 19 is illustrated in position on the work table 17 and engaged by the improved chuck 10.

The billet 19 may be square as illustrated and includes longitudinally extending faces 19a, 19b, 19c, and 19d.

As illustrated the plane face 19a of the billet is presented upwards, and the removing or chipping away of the surface material thereof has just been completed by the chipping machine.

Without the use of the improved automatic chuck of the present invention, it has heretofore been a relatively laborious and time consuming task to turn the billet for presenting face 19b upwardly for being worked on by the tool head, after the face 19a has been chipped.

By the use of the present improved automatic chuck the billet 19 is very rapidly and easily turned, so that after the surface 19a has been chipped, the surface 19b may be quickly turned and clamped in proper position for being worked on by the tool head.

The embodiment of the chuck 10 includes two clamping, turning, and guiding units 20, each clamping, turning, and guiding unit 20 being as illustrated identical with the other, and being longitudinally spaced from each other on the table 17, for handling one end of the billet 19.

Common control means for actuating the units 20 are indicated generally at 21 and the control means 21 is operated by a handle 22.

Each unit 20 includes a base plate 23 secured as by cap screws 24 to the work table 17.

Releasable clamping means are mounted on the base plate 23 and preferably includes a stationary jaw 25 extending upwardly from the rear of the base plate 23, and a movable jaw 25' guide mounted for sliding laterally towards and from the jaw 25 and likewise extending upwardly from the base plate 23.

The guide mounting means for the movable jaw 25' may include a flanged tongue 26 protruding upwardly from the base plate 23 and extending laterally thereof, and sliding in a complementary groove 26' formed in the jaws 25'.

The control means 21 for actuating the units 20, preferably include for each unit 20 a link 27 pivotally connected at its inner end with the unit jaw 25' and pivotally connected at its outer end with the outer end of a drive arm 28 which is secured to and extends upwardly from one end of a longitudinally extending shaft 29 journalled on the front side of the bed 12.

The shaft 29 is selectively oscillated for moving the jaws 25' towards and from the jaws 25 for engaging and releasing the sides of a billet therebetween, as by means of a driven arm 30 secured at the central portion of the shaft 29 and extending downwardly therefrom.

The lower end of the driven arm 30 is slot and pivot connected with the outer end of a piston rod 31 which extends outwardly through a bore in the bed 12, and from and through a suitable stuffing box 32 in the front end wall 33 of a double acting compressed air cylinder 34.

The inner end of the piston rod 31 is secured in the usual manner to a piston 35 within the double acting compressed air cylinder 34.

For moving the piston 35 inwardly towards the carriage and thus for moving the jaws 25' outwardly to a released position, compressed air may be admitted to the outer end of the cylinder 34 as through a pipe line 36 communicating with the cylinder at the front side of the piston 35.

Similarly air may be admitted to the other end of the cylinder 34 on the opposite side of the piston 35 for moving the piston outwardly and thus the jaws inwardly into clamping position, as by means of a pipe line 36' communicating with the cylinder on the rear side of the piston 35.

The pipe lines 36 and 36' lead outwardly from the cylinder 34 and upwardly to a multiple way control valve 37 preferably mounted on the front side of the bed 12 just above the level of the work table 17.

Compressed air is fed to the multiple way control valve 37 as by means of input pipe line 38.

The valve 37 has also connected thereto a relief pipe line 36" which communicates from the valve to the atmosphere, and the valve 37 is of any usual and well known construction, and is operated by the handle 22, whereby movement of the handle 22 to one position makes a communicating connection between the input pipe line 38 with the pipe line 36 for the outer end of the cylinder, and at the same time makes a communicating connection between the pipe line 36' for the other end of the cylinder and the relief pipe line 36".

Movement of the handle 22 to another position reverses these connections, that is to say, makes a communicating connection supplying compressed air from the input pipe line 38 through the pipe line 36' to the cylinder 34 at the rear side of the piston 35, and making a communicating connection between the pipe line 36 and the relief pipe line 36".

As illustrated in Fig. 1 the handle is in position feeding air to the cylinder through the pipe line 36' for moving the clamping jaws 25' towards the jaws 25 and clamp engaging the sides 19b and 19d of the billet 19 between the jaws.

Means operable when the clamping means are in released position, and preferably during releasing movement thereof, are provided for turning the work piece, that is, the billet 19 for presenting another surface location in position to be worked on, that is to say, for presenting the surface 19b, after the surface 19a has been completely chipped.

The turning means preferably include a set of laterally spaced supports 40 and 40' for each unit 20, and each set of supports is laterally spanned by the face of the billet which is lowermost immediately before, during, and immediately after engagement by the clamping means.

In each unit the support 40 is preferably at the lower end of and extends forwardly from the jaw 25; and the support 40' is similar at the lower end of and extends rearwardly from the jaw 25'.

The turning means further includes for each unit 20, trip lever means indicated generally at 41, and preferably actuated by releasing movement of the jaw 25', each trip lever means being adapted for immediately moving the billet 19 from a spanning position on the supports 40 and 40', after the clamping means have released the billet, and during further releasing movement of the jaws 25' away from the jaws 25.

Each trip lever means 41 preferably includes a trip lever 42 which is slot and pivot connected at its upper end as at 43 at one side of the jaw 25 of its unit 20.

Each lever 42 depends downwardly from its slot and pivot connection on its jaw 25 and the lower forward face 44 of each lever 42 is located adjacent the then lower rear corner C of the billet 19.

Each lever 42 preferably extends below the upper surface of the supports 40 and 40', and when the clamping means are in billet engaging position, the lower extremity 45 of each trip lever 42 is positioned in front of a trip and turning tongue 46 which is located at the rear extremity of and extends upwardly from a shank 47, and the shank 47 is preferably secured for adjustment laterally on lower portions of the jaws 25' at the side thereof corresponding with the side at which the trip lever 42 is located.

The means for securing the trip tongue shank 47 to its jaw 25' may include a plurality of laterally spaced tongues 48a formed on the jaw 25' for selectively engaging with a groove 48b formed in the shank 47.

A plurality of laterally spaced threaded sockets 49 are formed in each jaw 25' for selectively receiving a cap screw 50 for securing the shank 47 to the jaw 25' at the desired position of lateral adjustment.

Accordingly when the jaws 25' move away from the jaws 25 by releasing operation of the chuck, each trip and turning tongue 46 will swing its engaged trip lever 42 forwardly thereby pushing the inner corner C of the billet 19 from the spanning position on the supports 40 and 40' illustrated in Fig. 8, to the position illustrated in Fig. 9, wherein the corner C has been caused by the force of gravity to fall downwardly between the supports 40 and 40'.

This falling movement of the billet 19 occurs preferably during the outward movement of the jaws 25' and accordingly the billet 19 fulcrums about the supports 40' as it turns about its longitudinal axis between the supports in the clockwise direction as viewed in Figs. 8, 9, 10, and 11.

During further movement of the jaws 25' outwardly from the jaws 25, the lower extremity 45 of each trip lever 42 latches over its cooperating forwardly moving latch and turning tongue 46, and each latch and turning tongue 46 then engages the then rear side face of the billet and further rotates the same in the clockwise direction as illustrated, through the intermediate position shown in Fig. 10, in which the billet 19 has been rotated an eighth turn clockwise from the position illustrated in Fig. 8.

Further outward movement of the jaws 25' causes the latch and turning tongues 46, engaging against the billet 19 at the rear of the corner C, to rotate the billet a further eighth turn about its longitudinal axis, thus completing the quarter turn necessary to present the face 19b of the billet upwardly in position for being worked on by the tool head 15, and the billet is then in the position illustrated in Fig. 11.

Means are preferably provided for guiding the piece or billet 19 during the turning thereof, and for returning the piece or billet to another position for spanning the supports, and the guide means preferably include a laterally extending guide member 51 secured as by means of cap screws 52 at one side of the jaws 25 and 25' on each unit base plate 23.

Each guide member 51 extends laterally on its base plate 23, and has formed on its upper face a cam surface indicated generally at 53 and including a rear horizontal portion 53a, an intermediate hump portion 53b, and a forward upwardly extending arcuate portion 53c.

When the billet 19 is pushed off the supports 40, the lower rear corner C of the billet falls upon the horizontal cam portions 53a and the lower forward corner C' of the billet falls upon the forward arcuate cam portions 53c, and the billet is guided during its turning by its corners C and C' following the cam surfaces.

In cooperation with the tongues 46 the intermediate hump portions 53b of the cam surfaces 53 serve to give the billets the final flop at the end of its quarter turn, and maintain the then lower front forward corner C of the billet 19 in the position illustrated in Fig. 11 for spanning the supports 40 and 40' when the jaws 25' are moved rearwardly to the billet for engaging the sides 19a and 19c of the billet.

It may be desired to clamp the billet in the intermediate position illustrated in Fig. 10 and for this purpose a stop screw 54 extends outwardly from a longitudinally movable slide bar 55 mounted in a guide 56 at the lower forward side of the bed 12 at the rear of the arm 30.

Means are provided for selectively longitudinally moving the head of the stop screw 54 for abutment by the rear face of the arm 30, which may include a connecting rod 57 secured at one end with the slide bar 55; and at its other end the connecting rod 57 is pivotally connected with the upper end of an upwardly extending arm 58 of a lever 59 which is pivotally secured on the bed as at 60, and includes an actuating foot lever 61 preferably extending longitudinally and horizontally from the pivotal mounting 60.

A compression spring 62 is preferably located between the slide bar 55 and a suitable stop 63 formed on the guide 56.

The head of the stop screw 54 is maintained normally by the spring 62 out of the path of the arm 30, but the arm 61 of the lever 59 may be depressed by a foot of the operator for moving the stop screw 54 in the path of the arm 30, whereby as illustrated in Fig. 6, the releasing forward movement of the jaws 25' will be stopped when the billet has reached the position illustrated in Fig. 6 which is the same as that illustrated in Fig. 10.

Reversing the flow of air in the cylinder 34 will then clamp the billet with one corner presented upwards as illustrated in Fig. 7 for enabling removal of any desired material at the upwardly presented corner.

I claim:

1. Apparatus for selectively positioning a piece of material for having work performed at one or more surface locations thereon, the apparatus including releasable means for clamping the piece and presenting one surface location in position to be worked on, the clamping means including members movable with respect to each other, control means for selectively moving the clamping means to engage or release the piece, and turning means including movable means mounted on one of the clamping members and actuatable by movement of the other member for turning engagement with the piece for presenting another surface location in position to be worked on.

2. Apparatus for selectively positioning a piece of material for having work performed at one or more surface locations thereon, the apparatus including releasable means for clamping the piece and presenting one surface location in position to be worked on, the clamping means including members movable with respect to each other, control means for selectively moving the clamping means to engage or release the piece, and turning means including a trip lever operatively mounted on one of the clamping members and actuatable by movement of the other member for turning engagement with the piece for presenting another surface location in position to be worked on.

3. Apparatus for selectively positioning a piece of material for having work performed at one or more surface locations thereon, the apparatus including releasable means for clamping the piece and presenting one surface location in position to be worked on, the clamping means including members movable with respect to each other, control means for selectively moving the clamping means to engage or release the piece, movable means mounted on one of the clamping members and actuatable by movement of the other member for turning engagement with the piece for presenting another surface location in position to be worked on, and means for guiding the piece during turning thereof.

4. Apparatus for selectively positioning a piece of material for having work performed at one or more surface locations thereon, the apparatus including releasable means for clamping the piece and presenting one surface location in position to be worked on, the clamping means including members movable with respect to each other, control means for selectively moving the clamping means to engage or release the piece, a trip lever operatively mounted on one of the clamping members and actuatable by movement of the other member for turning engagement with the piece for presenting another surface location in position to be worked on, and means for guiding the piece during turning thereof.

GEORGE W. LENTZ.